(12) United States Patent
Guilkey

(10) Patent No.: US 7,066,697 B2
(45) Date of Patent: Jun. 27, 2006

(54) DUNNAGE TRANSPORT ORGANIZER

(76) Inventor: Steve Guilkey, 3065 Dry Bone Rd., Peebles, OH (US) 45660

( * ) Notice: Subject to any disclaimer, the term of this patent is extended or adjusted under 35 U.S.C. 154(b) by 0 days.

(21) Appl. No.: 09/878,578

(22) Filed: Jun. 11, 2001

(65) Prior Publication Data

US 2002/0187015 A1    Dec. 12, 2002

(51) Int. Cl.
*B60P 7/08* (2006.01)
(52) U.S. Cl. .............. 410/32; 410/35; 410/46; 410/153
(58) Field of Classification Search ............... 410/46, 410/31, 32, 35, 121, 153, 94; 108/55.3; 206/386, 206/509; 224/42.37; 211/59.1
See application file for complete search history.

(56) References Cited

U.S. PATENT DOCUMENTS

| | | | |
|---|---|---|---|
| 1,559,827 A | * | 11/1925 | Wittman |
| 1,830,085 A | * | 11/1931 | Bodenstein, Jr. et al. |
| 2,443,684 A | * | 6/1948 | Lazarus |
| 2,673,700 A | * | 3/1954 | Eberhardt |
| 2,971,768 A | * | 2/1961 | Ackley et al. |
| 3,217,892 A | * | 11/1965 | Goodell |
| 4,317,645 A | * | 3/1982 | Van Gompel ............... 410/94 |
| 4,756,651 A | * | 7/1988 | Van Gompel et al. ........ 410/46 |
| 4,887,946 A | * | 12/1989 | Sevier ......................... 410/32 |
| 4,915,033 A | * | 4/1990 | Bond |
| 5,618,153 A | * | 4/1997 | Lindgren |
| 5,636,951 A | * | 6/1997 | Long et al. ................. 410/85 |
| 5,636,952 A | * | 6/1997 | Richardson ................ 410/121 |
| 6,062,781 A | * | 5/2000 | Glaser ....................... 410/100 |
| 6,210,087 B1 | * | 4/2001 | Bacon ......................... 410/35 |
| 6,270,299 B1 | * | 8/2001 | Rehbein ...................... 410/41 |
| 6,299,396 B1 | * | 10/2001 | Chasen ...................... 410/120 |

* cited by examiner

*Primary Examiner*—Stephen T. Gordon
(74) *Attorney, Agent, or Firm*—Jeffrey Furr

(57) ABSTRACT

The dunnage transport organizer is a device that consists of a pole with a dunnage puncture point at one end with a cover for that point, that attaches to a base which has pallet clamps to attach it to a pallet or other such transportation means. The pole is perpendicular to the adjustable base. The adjustable base is attached to an ordinary pallet with the pallet clamps and adjustment straps being adjustable to fit different sizes of pallets. The pole has to be connected to the base with the opposite end with a point to allow the puncturing of the dunnage. The dunnage puncture point has a cover for safety reasons and safe transportation of the dunnage.

1 Claim, 14 Drawing Sheets

025
DUNNAGE TRANSPORT ORGANIZER

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to art of transportation devices, specifically an improvement to the transportation of dunnage.

2. Description of Prior Art

With the expense of waste disposal and the modern push for re-use and recycling there is a need for an easy, inexpensive and convenient method for the transportation of dunnage, which is the packaging material and transportation containers. Dunnage is usually made of cardboard, but can also be made out of other materials The current method is to either throw the dunnage away or to transport it loose in the back of the shipping vehicles. The first method is a waste of money and natural resources as the material is not being re-used or recycled, but deposed of There is a cost associated with the deposing large quantities of dunnage in already crowded trash dumps and land fields. There is also a great cost of natural resources since the material is not being recycled. The second method is inefficient where the dunnage can shift and is hard to maneuver. The dunnage can be damaged and can not be moved by conventional methods such as the forklift.

There is a need for a dunnage transport device and method that will make it easy to move and transport the dunnage. There is a need to use common moving methods and devices such as a forklifts and available items such as a pallet. The transportation device must be compact and easy to transport when not in use as disclosed in U.S. Pat. No. 5,020,674, by Thorud, et al. for a collapsible container and pallet assembly. The container may be folded between an upright container configuration and a collapsed stored configuration.

There is still room for improvement within the art.

1. Field of the Invention

U.S. Class 410/32

2. Description of Related Art Including Information Disclosed Under 37 CFR § 1.97** >and 1.98<.

SUMMARY OF THE INVENTION.

It is the object of this invention to provide an inexpensive, efficient, less time intensive way to handle, reuse and handle dunnage, which is the package material. The dunnage transport organizer is a device that consists of a pole with a dunnage puncture point, a dunnage puncture point cover, a base, adjustable straps and pallet clamps.

The dunnage point is perpendicular to the adjustable base. The adjustable base is attached to an ordinary pallet with the pallet clamps. The pallet clamps being adjustable to fit different sizes of pallets. The pole has to be connected to the base with the opposite end with a point to allow the puncturing of the dunnage. The dunnage puncture point also needs a cover for safety reasons and safe transportation of the dunnage. The dunnage transportation device needs to be made of a sturdy and lightweight material.

Objects and Advantages

With the need to re-use and re-cycle dunnage, there is a need for an inexpensive, effective, convenient, and easy way to transport used dunnage to be reused. Today's methods are not effective or inexpensive. The dunnage is either thrown away or move in loose bulk. The dunnage transport organizer was developed as a solution to these problems.

The use of a dunnage transport organizer would greatly reduce the difficulty in the moving and transport of used dunnage. It would also increase the amount of dunnage that was re-used and re-cycled. It also current transportation methods and devices can be used, since it uses a pallet to transport the dunnage. The dunnage transport organizer is more efficient, effective, cheaper and functional than the current art.

BRIEF DESCRIPTION OF THE DRAWING

Without restricting the full scope of this invention, the preferred form of this invention are illustrated in the following drawings.

DESCRIPTION OF THE PREFERRED EMBODIMENT(S)

Figure 1:
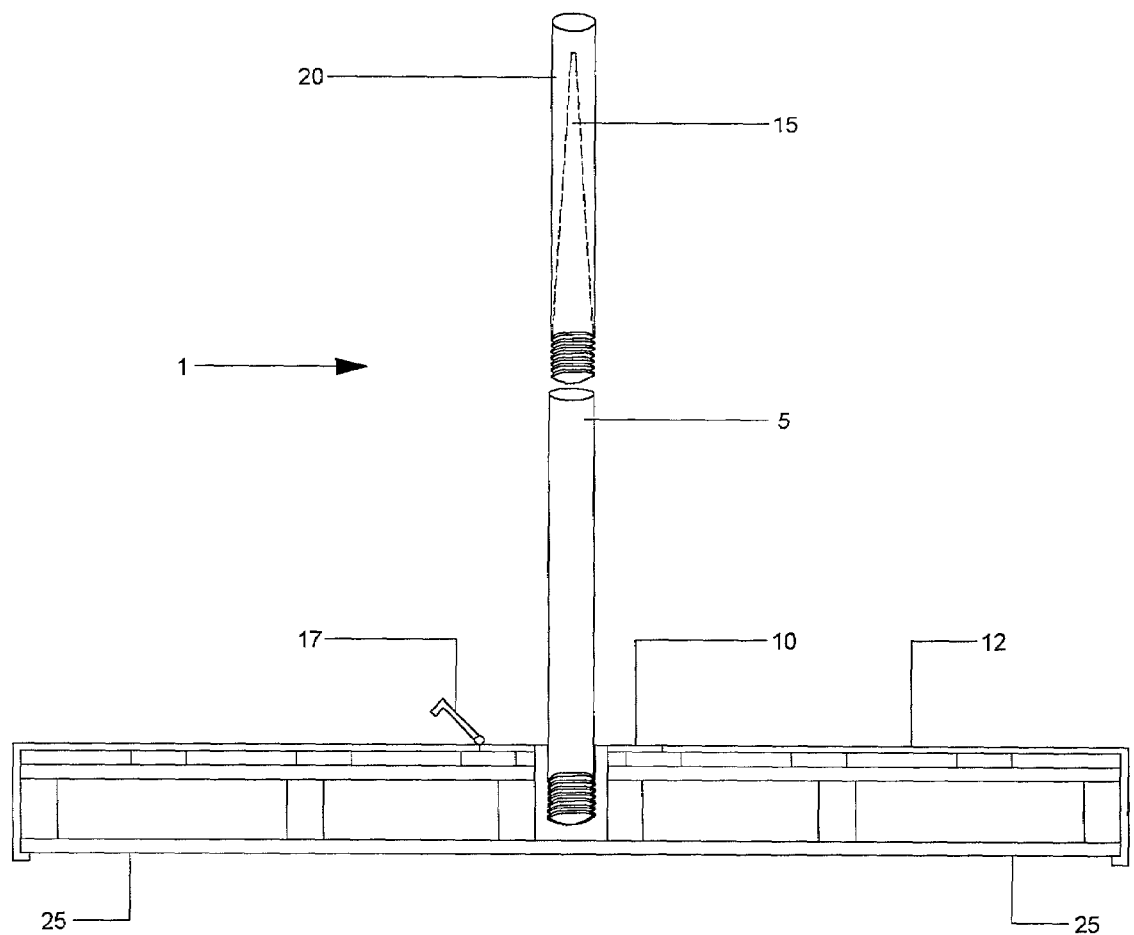
FIG. 1 shows a side view of the dunnage transport organizer.

The preferred embodiment of the invention is described below. As shown is FIG. 1, the Dunnage Transport Organizer 1 consists of a metal pole 5 approximately 1" in diameter with a threaded end to connect to a base 10 with the opposite end coming to a point to form a dunnage puncture point 15. For safety purposes, there is a dunnage puncture point cover 20, which covers the dunnage puncture point 15 when it is not in use. The base 10 has metal handles 17 and adjustment straps 12 are used change the adjustment size of the Dunnage Transport Organizer 1. Dunnage Transport Organizer 1 is adjustable to fit different size pallets. Metal latches 25 are used to secure the Dunnage Transport Organizer 1 to the pallet 30.

Figure 2:
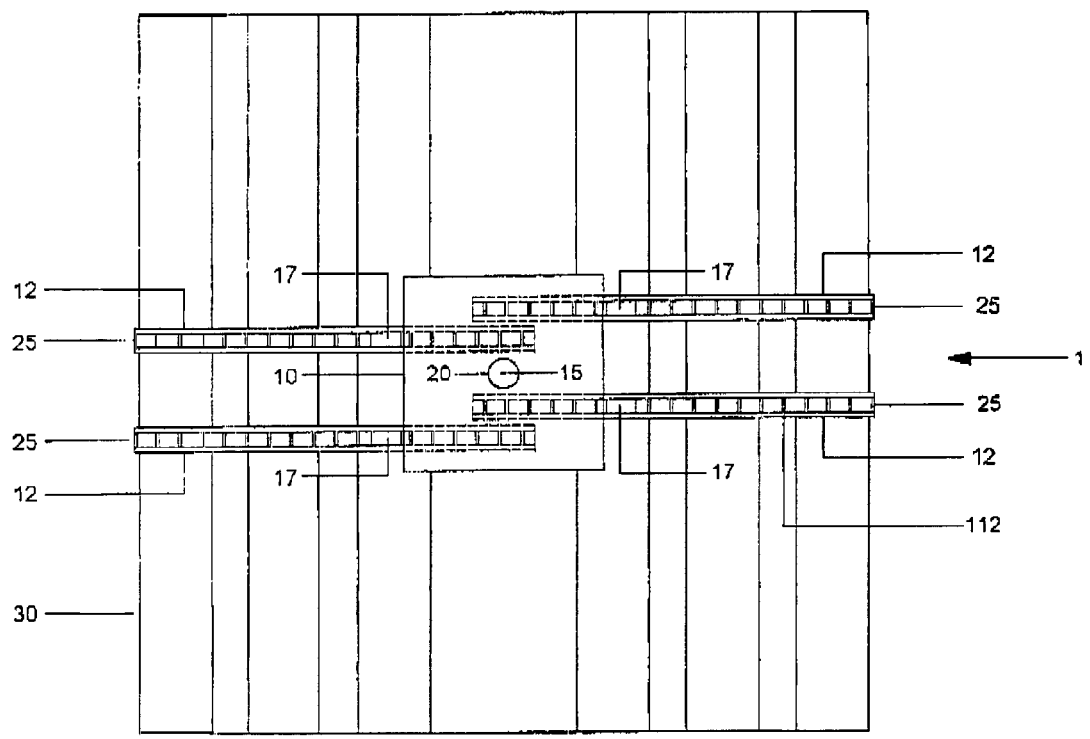
FIG. 2 shows a top view of the dunnage transport organizer.

FIG. 2 shows a top view of the Dunnage Transport Organizer 1. The dunnage puncture point cover 20 covers the dunnage puncture point 15, which on one tip of the pole 5. The pole 5 is attached to the base 10. The pallet latches 25 are attached to the base 10 by the adjustable straps 12 and metal handles 17 that are adjustable and connected and secured to the sides of pallet 30. The pallet latches 25 and the adjustable straps 12 secure the base 10 to the pallet 30.

Figure 3:
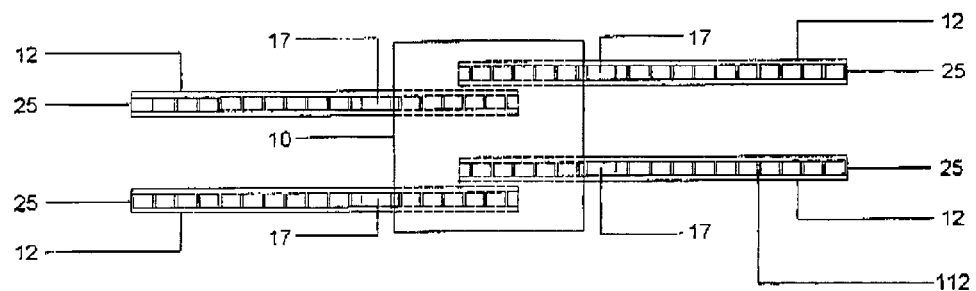
FIG. 3 shows a bottom view of the dunnage transport organizer.

FIG. 3 shows a bottom view of Dunnage Transport Organizer 1. The base 10 is shown with the pallet latches 25 and adjustable straps 12 attached.

Figure 4:
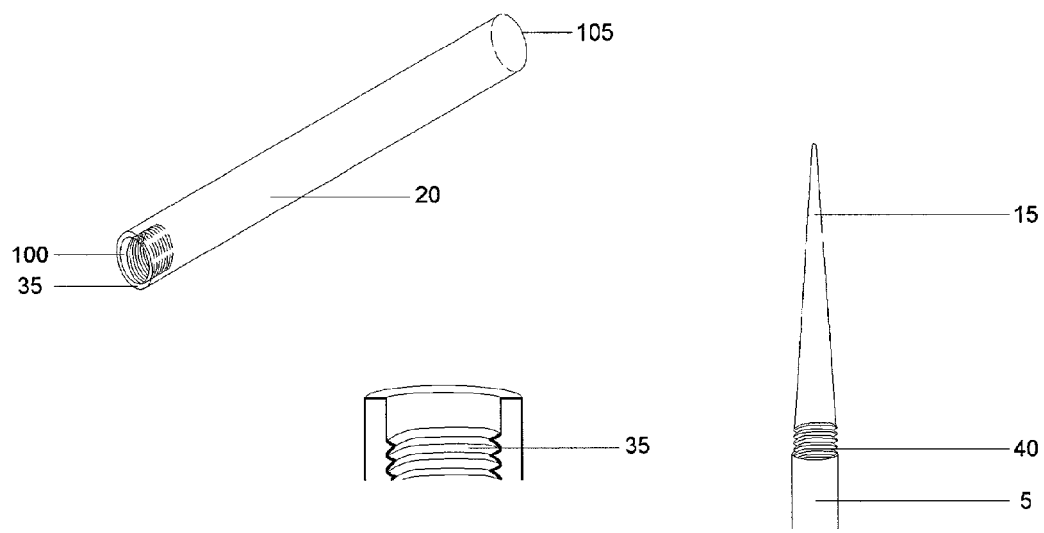
FIG. 4 shows the threaded method of covering the dunnage puncturing point.

The dunnage puncture point cover 20 is used to cover the dunnage puncture point 15 when the dunnage puncture point 15 is not being used. The dunnage puncture point cover 20 is a safety feature to protect against injury. The dunnage puncture point cover 20 is a tube that is the same diameter as the pole 5. The dunnage puncture point cover 20 has enough material removed to fit securely on and cover the dunnage puncture point 15 and is approximately 4" long. In the preferred method, the dunnage puncture point has an open end 100 where it fits onto the dunnage puncture point 15 and a capped end 105 as shown in FIG. 4. The dunnage puncture point cover 20 has screw threads 35 on the interior of cover 20 inside of the open end 100. Any standard thread size can be used. The thread 35 run approximately 1" inside the dunnage puncture point cover 20. The pole 5 has matching threads 40 that match the thread 35 of the dunnage puncture point cover 20. These threads 40 run approximately 1'. These threads 35 and 40 allow the dunnage puncture point cover 20 to be secured on the pole 5 by the tightening by turning the dunnage puncture point cover 20 clockwise on the pole 5.

Figure 5:
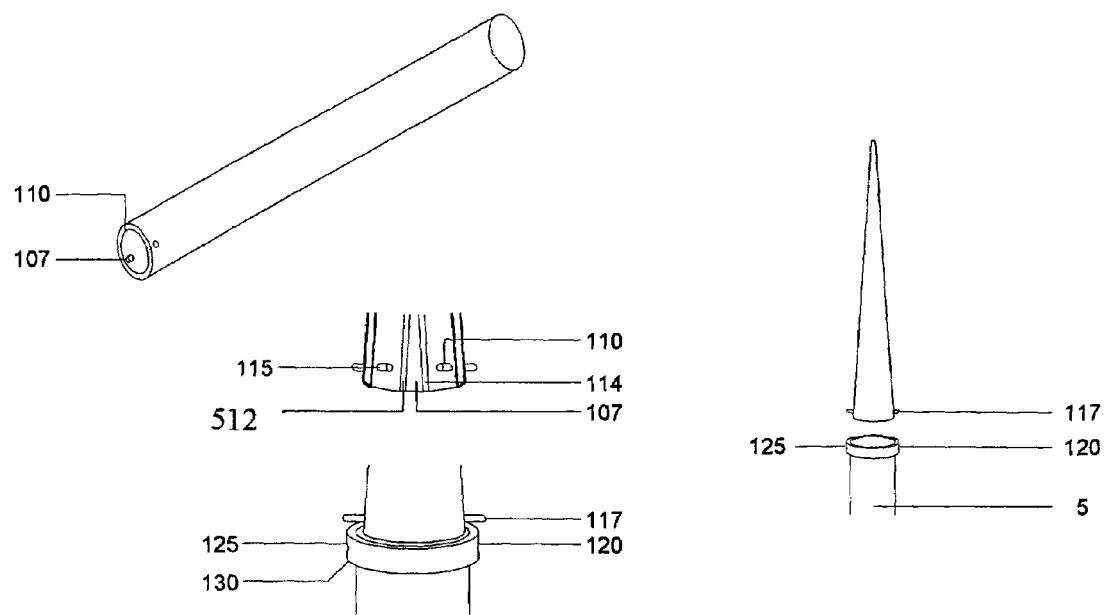
FIG. 5 shows the slotted method of covering the dunnage puncturing point.

FIG. 5 shows an alternative method of securing the dunnage puncture point cover 20 to the pole 5. It is a slot method in which the open end 100 of the dunnage puncture point cover 20 has a lip 110 with has two slots 107 that are opposite from each other. The lip 110 has four raised edges 115 that are perpendicular to the lip 110 and next to the slots 107. The raise edge 512 to the left of the slot 107 are long edges that runs at least 1'. The raised edges 114 to the right of the slots 107 is approximately ¼" high. The pole has two knobs 117 just below the dunnage puncture point 15. These knobs 117 are on opposite sides of the pole 5. Just below the knobs 117 is a ring mechanism, which consists of a top ring 120, a spring 125 and a bottom ring 130. The bottom ring 130 is fixed to the pole 5. The spring 125 is connected to the bottom ring 130 and the top ring 120 through a connecting means such as a weld. The top ring 120 is not connected to the pole 5 with a hole in the center of the ring so that it is not touching the pole 5. When the dunnage puncture point cover 20 is to be used in this embodiment, the knobs 117 fit into the slots 107. The bottom of the cover will touch the top ring 120 and will compress the spring 125 down. This will create an upward force against the cover 20. Once compressed, the cover 120 is turned 90 degrees to the right and released. This will secure the cover 20 through the compression of the spring 124 securing the knobs 107 between the edges 512 and 114.

Figure 6:
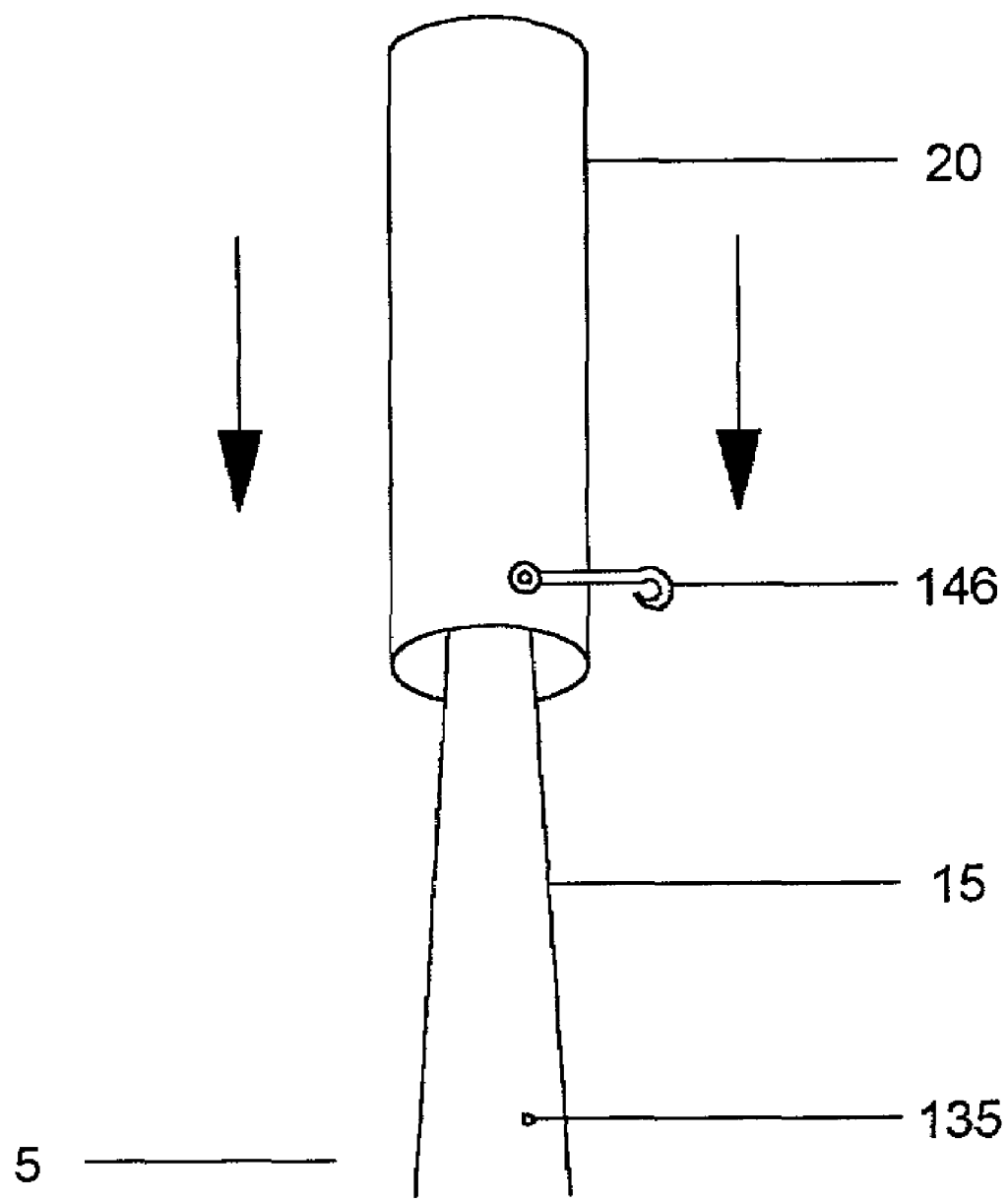
FIG. 6 shows the cover top method of covering the dunnage puncturing point.

FIG. 6 shows another method of securing the dunnage puncture point cover 20 over the dunnage puncture point 15. The dunnage puncture point cover 20 is place over the dunnage puncture point 20. It is secured by a hook mechanism 146 that is latched to a knob 135.

Figure 7:
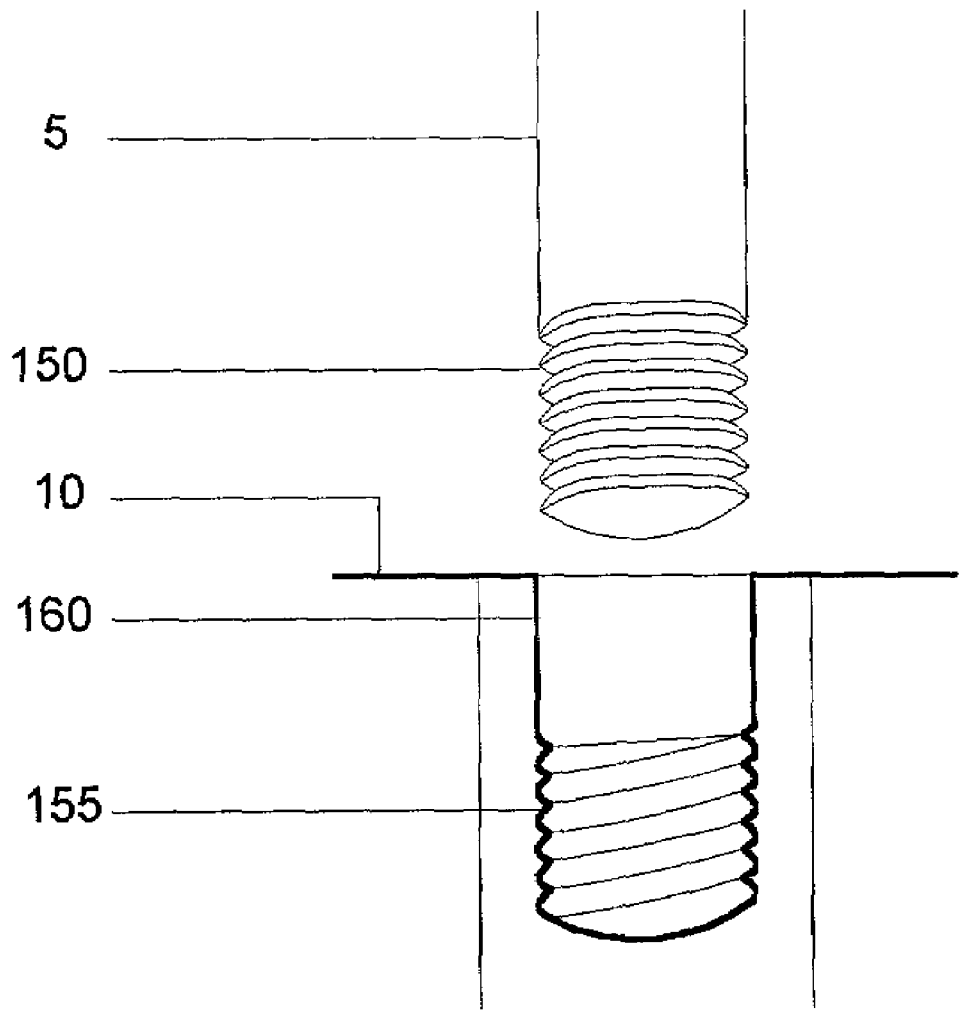
FIG. 7 shows how the pole is connected to the base.

FIG. 7 displays how the pole S is secured to the base 10. In the preferred embodiment, the pole 5 is designed to be detachable from the base 10. This is so the dunnage transport organizer 1 can be easily stored and transported when not in use. To this means, the preferred embodiment the pole 5 has threads 150 on the end that is opposite of the dunnage puncture point 15. The threads 150 would be of a standard size used in the industry and would run approximately 1". The base 10 would have place in the center of it where material would be removed to form a hole 160 slightly larger than the diameter of the pole 5. The hole 160 would have threads 155 on the wall. These threads 155 would match the threads 150 on the pole 5. The pole 5 would be connected to the base 10 by placing the threaded end of the pole 5 into the hole 160 in the base 10 and turning it clockwise. The pole 5 is removed from the base 10 by turning it counterclockwise. The pole 5, in the preferred embodiment will be at a 90° angle to the base 10.

Figure 8:
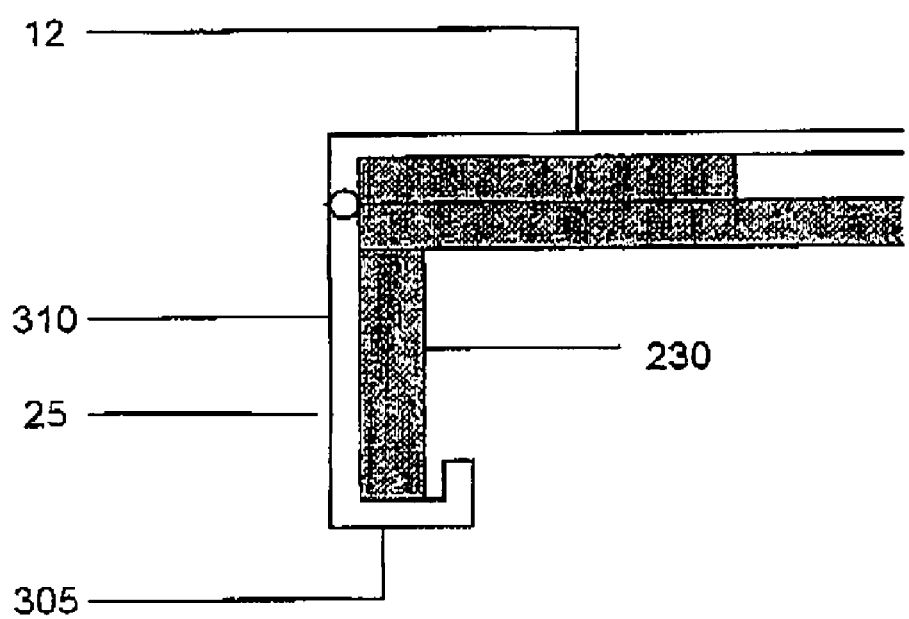
FIG. 8 displays how the metal latches attached to the pallet.
Figure 9:
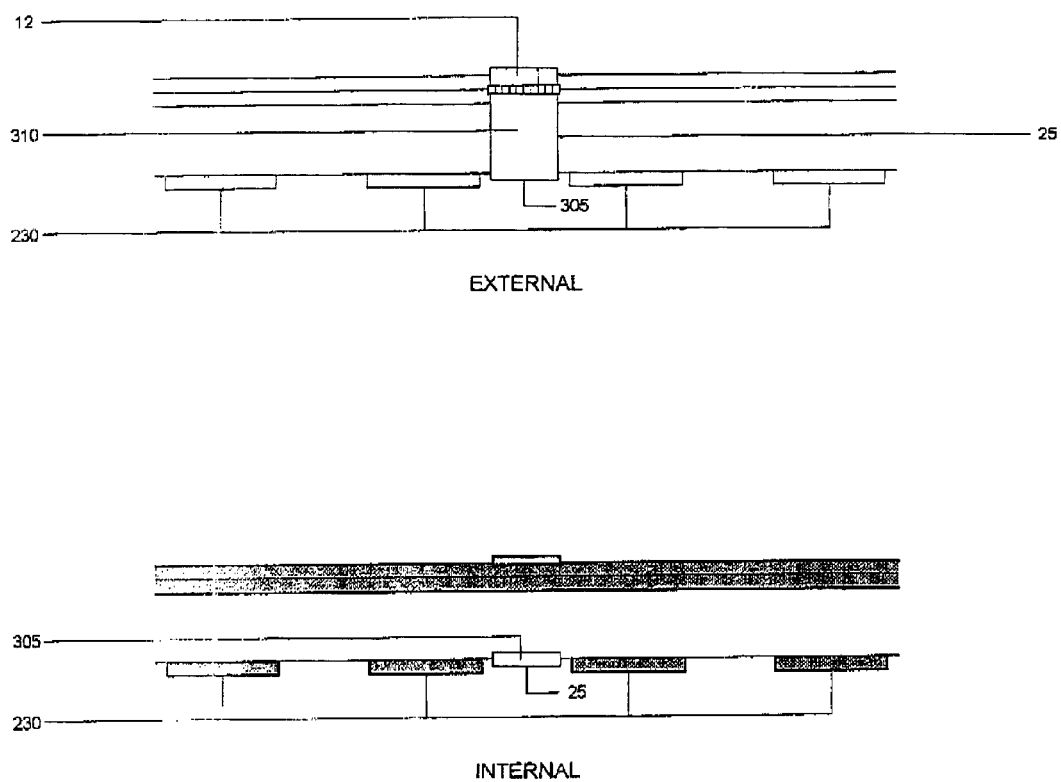
FIG. 9 displays the interior and exterior view of the metal latches attaching to the pallet.

FIG. 8 and 9 shows in detail the pallet latches 25 which are pallet connection means. FIG. 8 shows a cross-cut view of the pallet latches 25 which shows that the pallet latches 25 are in the form of a bracket. The bracket is in an "L" shape with an internal wall 300 and a bottom wall 305. All of the walls would have the same thickness of ½". The dimension of the external wall 310 is 2" wide by 2" in length. The bottom wall 305 is 2"wide by 3½" in length. The pallet latch 25 is made out of a die case material heavy duty material and light material such as aluminum and poured into a single mold. In the preferred embodiment the pallet latches 25 are placed between the bottom pallet boards 230. This is shown in FIG. 9 from both an internal and external view. The adjustable straps 12 are connected to the pallet latches through a connecting means. The connecting mean can be a hinge, welding or a series of nuts and screws.

Figure 10:
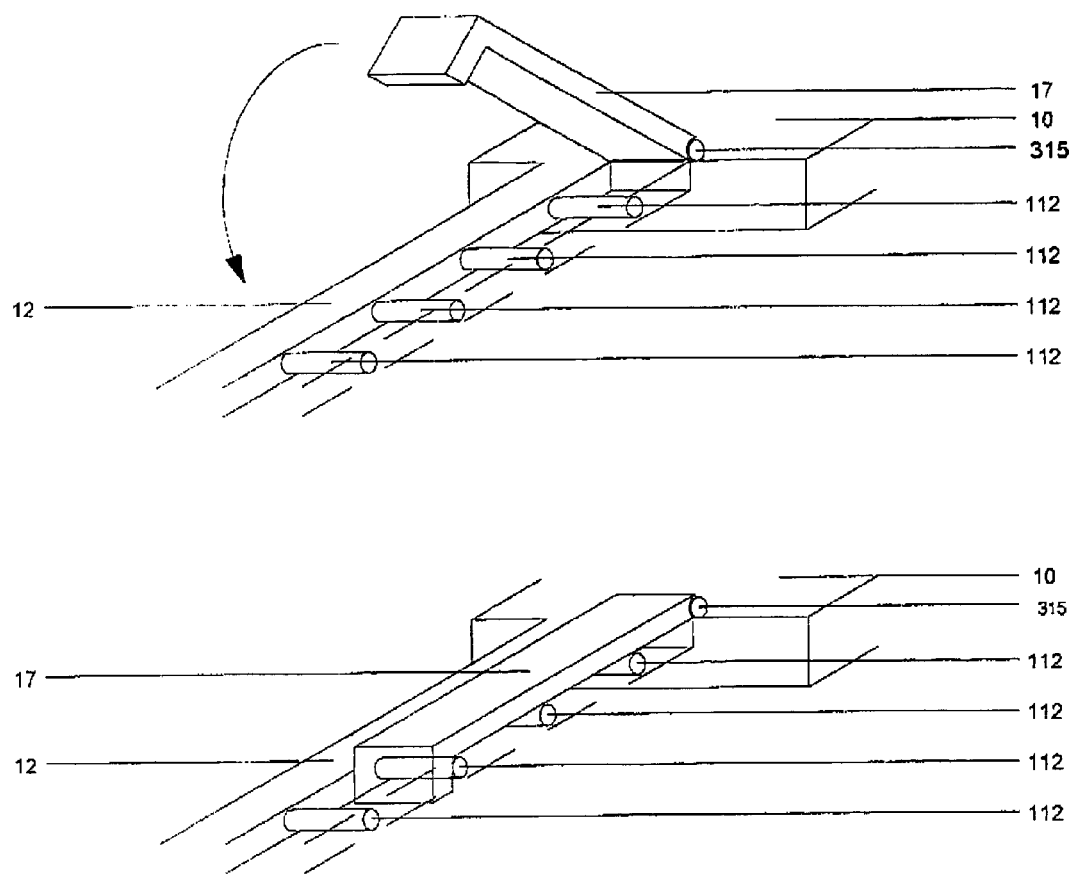
FIG. 10 shows the metal handles latching onto the adjustable straps.

The adjustable straps 12 are used to attach the base 10 to the pallet. They have an adjusting means that will allow the dunnage transport organizer 1 to fit different size pallets 30. FIG. 10 displays one of the possible adjusting means, a metal handle 17 that latches onto adjustment strap cylinder 112 of the adjustment strap 12. The adjustment straps 12 are a metal bar with circular cylinder between two bars. The adjustment straps 12 run through the base 10 through openings in the base. The adjustment straps 12 are moved in through the base 10 until they are secure against the sides of the pallet 30. The metal handle 17 is then moved down to the latch against the appropriate adjustment strap cylinder 112. The metal handle 17 is connected to the base 10 through a hinge mechanism 315.

Additional Embodiments

Figure 11:
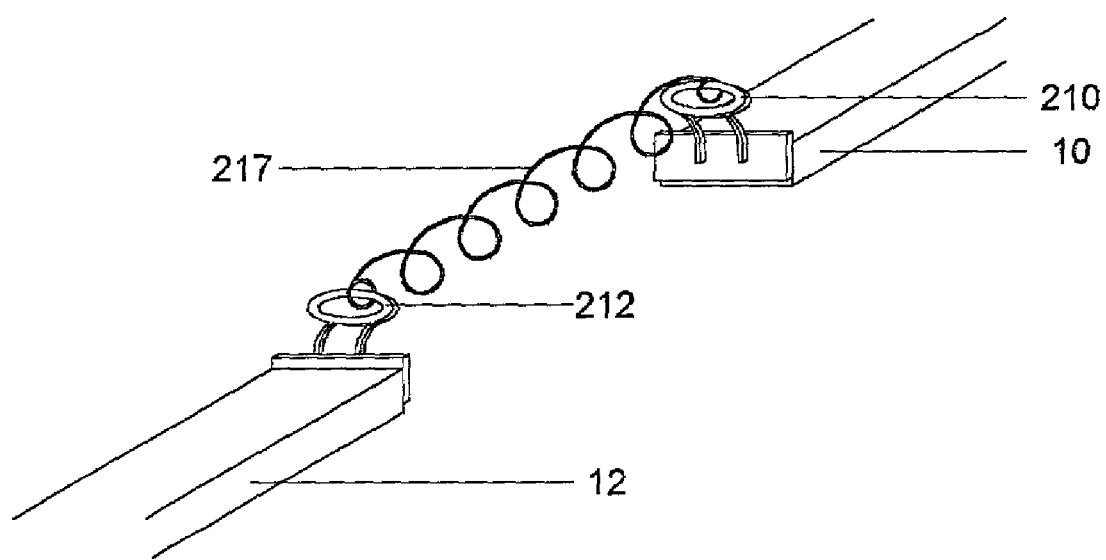
FIG. 11 shows the use of a tension spring by the adjustable straps.

One additional embodiment as shown in FIG. 11, the base 10 is connected to the adjustable straps 12 by a tension spring 217 that is connect to a adjustable strap eyelet 212 and a base eyelet 210

Figure 12:
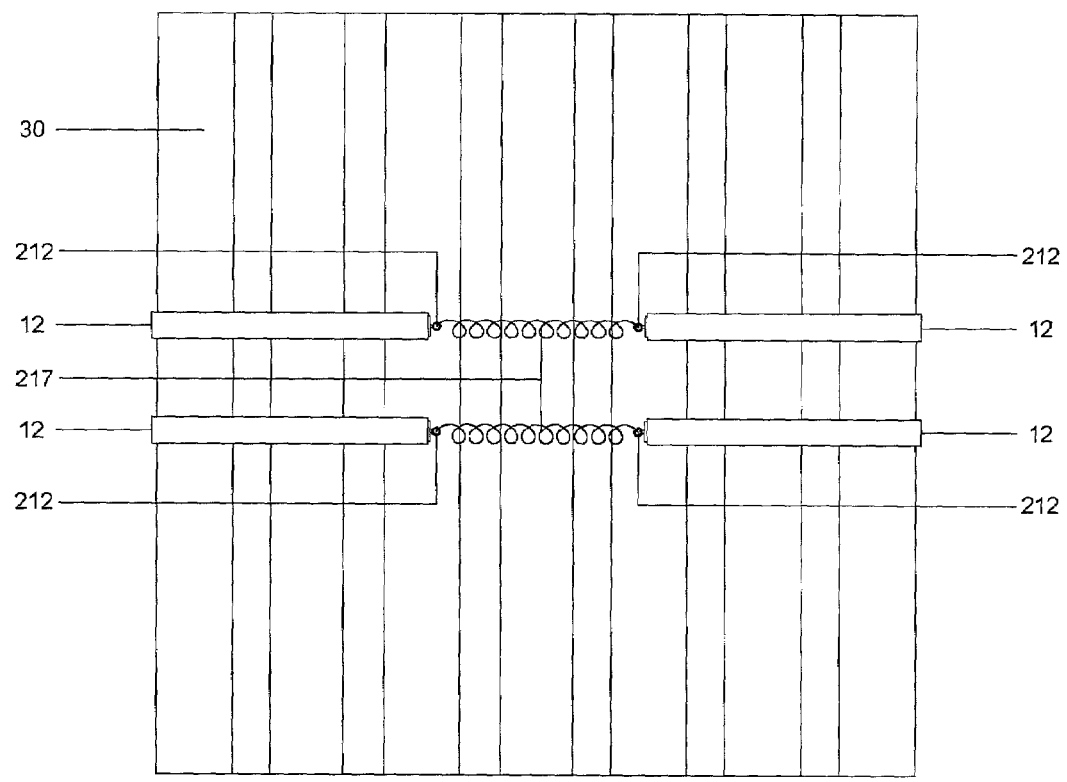
FIG. 12 shows an alternate design with the use of tension springs.

FIG. 12 shows a different method of using the tension spring 217. The adjustment straps 12 are made of a flexible material such as nylon, woven metal or other similar high strength material. Two adjustment straps 12 runs parallel to each other. The end of the adjustment straps 12 each has an adjustment strap eyelet 212. The tension spring 217 connects to each adjustment strap eyelet 212 of the adjustment strap 12.

Operation

Figure 13:
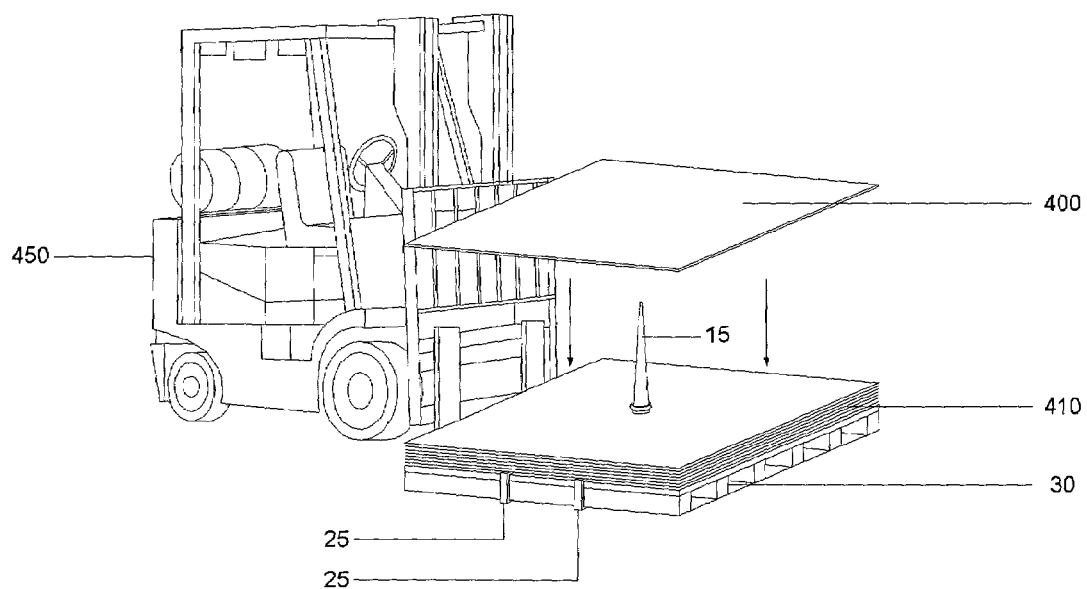
FIG. 13 displays the dunnage transport organizer in operation.

As shown in FIG. 13, the dunnage 400 is placed over the dunnage transport organizer 1. The dunnage 400 is forced onto the dunnage puncture point 15. The dunnage 400 is stacked onto the pole 5. This secures the stack 410 to the dunnage transport organizer 1 and through it to the pallet 30 This allows for easy transport of the dunnage 400 by a forklift 450 or some other type of transport device.

Figure 14:
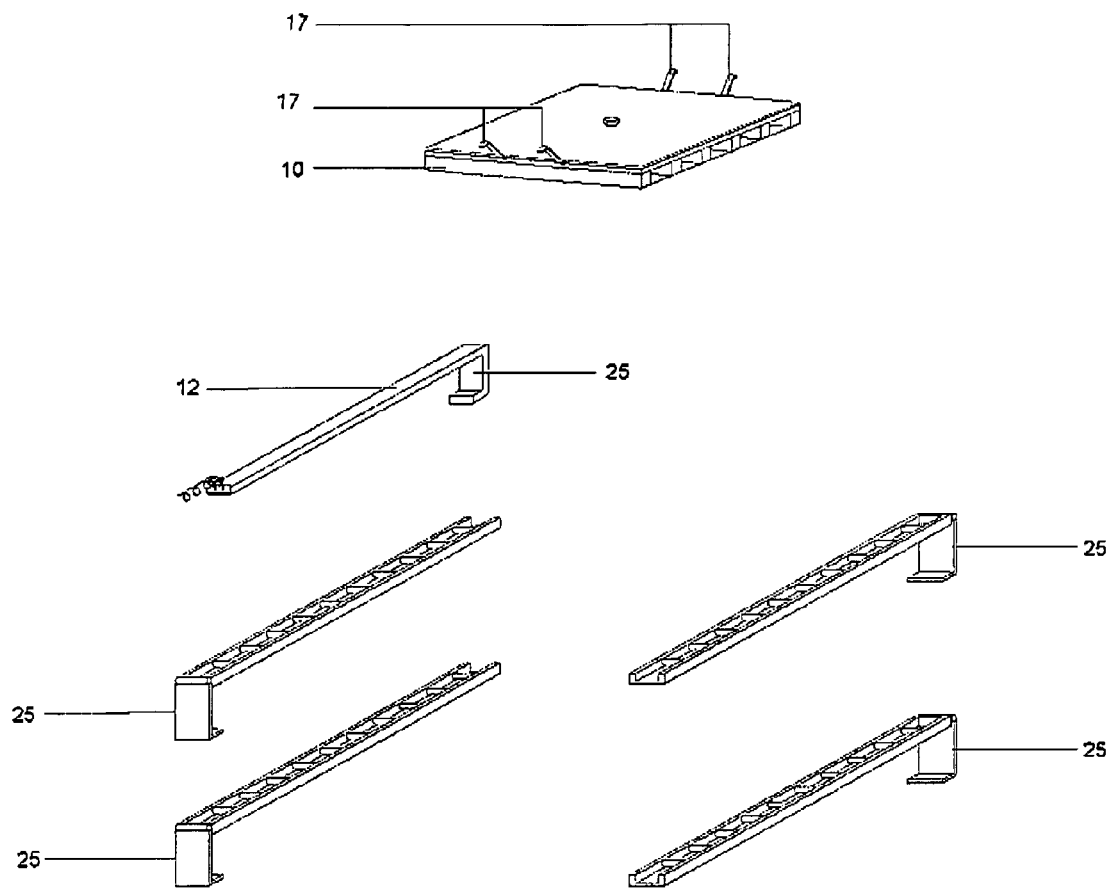
FIG. 14 shows the detachable components of the dunnage transport organizer.

The dunnage transport organizer 1 is designed to be easy to transport and store when not in use. FIG. 14 shows the individual parts that the dunnage transport organizer 1 can be broken down into. The base 10, the pole 15 with the dunnage puncture point cover 20 attached, and the adjustment straps 12 with the metal latches 25 attached. The component of the dunnage transport organizer 1 are made of a durable, lightweight, strong material such as aluminum or titanium steel. The adjustment straps 12 and the pole can be tied together for ease of transport.

Advantages

The previously described version of the present invention have many advantages including its ease of use, its reduction in the difficulty in the moving and transport of used dunnage and its impact on increasing the amount of dunnage that was re-used and re-cycled. It also allows current transportation methods to be used, since it uses a pallet to transport the dunnage.

Conclusion, Ramifications, and Scope

With the need to re-cycle and reduce waste, the dunnage transport organizer adds ease of re-use, transportation and re-cycling. The dunnage transport organizer solves the problems of transporting and re-using dunnage for packaging and transportation of shipping materials.

Although the present invention has been described in considerable detail with reference to certain preferred versions thereof, other versions are possible. For example, the base could be of different dimension, a different material could be used to make it, or another device besides a pallet could be used. Therefore, the point and scope of the appended claims should not be limited to the description of the preferred versions contained herein.

That which is claimed is:

1. A device comprising:
   a pole with a pointed end with the end opposite said pointed end attached to a base, where said base has adjustable straps which attach to metal latches that attach to a transportation means.

* * * * *